US011379358B2

(12) United States Patent
Brandt

(10) Patent No.: US 11,379,358 B2
(45) Date of Patent: Jul. 5, 2022

(54) UNRETIRING MEMORY DEVICE BLOCKS

(71) Applicant: Micron Technology, Inc., Boise, ID (US)

(72) Inventor: Kevin R Brandt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/103,346

(22) Filed: Nov. 24, 2020

(65) Prior Publication Data

US 2021/0081314 A1    Mar. 18, 2021

Related U.S. Application Data

(63) Continuation of application No. 16/157,816, filed on Oct. 11, 2018, now Pat. No. 10,877,880.

(51) Int. Cl.
*G06F 12/00* (2006.01)
*G06F 13/00* (2006.01)
*G06F 13/28* (2006.01)
*G06F 12/02* (2006.01)
*G06F 12/1009* (2016.01)

(52) U.S. Cl.
CPC ...... *G06F 12/0246* (2013.01); *G06F 12/1009* (2013.01); *G06F 12/0253* (2013.01); *G06F 2212/7201* (2013.01); *G06F 2212/7204* (2013.01); *G06F 2212/7205* (2013.01)

(58) Field of Classification Search
CPC ............. G06F 12/0246; G06F 12/0253; G06F 2212/7205; G06F 2212/7201
USPC ........................................................ 711/103
See application file for complete search history.

(56) References Cited

U.S. PATENT DOCUMENTS

| 10,877,880 B2 | 12/2020 | Brandt | |
| 2010/0064096 A1* | 3/2010 | Weingarten | G11C 16/349 711/103 |
| 2011/0302445 A1* | 12/2011 | Byom | G11C 29/883 714/6.1 |
| 2013/0128666 A1 | 5/2013 | Avila et al. | |
| 2013/0145076 A1* | 6/2013 | Chiueh | G06F 11/1417 711/103 |
| 2016/0179406 A1* | 6/2016 | Gorobets | G11C 11/5628 711/103 |
| 2017/0286093 A1* | 10/2017 | Steshenko | G06F 8/71 |

(Continued)

OTHER PUBLICATIONS

U.S. Appl. No. 16/157,816, U.S. Pat. No. 10,877,880, filed Oct. 11, 2018, Unretiring Memory Device Blocks.

*Primary Examiner* — Edward J Dudek, Jr.
*Assistant Examiner* — Sidney Li
(74) *Attorney, Agent, or Firm* — Schwegman Lundberg & Woessner, P.A.

(57) ABSTRACT

Various examples are directed to systems and methods for managing a memory device. Processing logic may identify a set of retired blocks at the memory device that were retired during use of the memory device. The processing logic may modify a first table entry referencing the first block to indicate that the first block is not retired. The processing logic may also modify a second table entry referencing the second block to indicate that the second block is not retired. The processing logic may also recreate a logical-to-physical table entry for a first page of at the first block, the logical-to-physical table entry associating a logical address with the first page.

20 Claims, 6 Drawing Sheets

(56) References Cited

U.S. PATENT DOCUMENTS

| | | | |
|---|---|---|---|
| 2017/0330635 A1* | 11/2017 | Shepard | ................ G11C 16/06 |
| 2019/0164614 A1 | 5/2019 | Prasad et al. | |
| 2020/0117590 A1 | 4/2020 | Brandt | |

* cited by examiner

UNRETIRING MEMORY DEVICE BLOCKS

PRIORITY APPLICATION

This application is a continuation of U.S. application Ser. No. 16/157,816, filed Oct. 11, 2018, which is incorporated herein by reference in its entirety.

TECHNICAL FIELD

The present disclosure generally relates to memory sub-systems, and more specifically, relates to data erasure in memory sub-systems.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
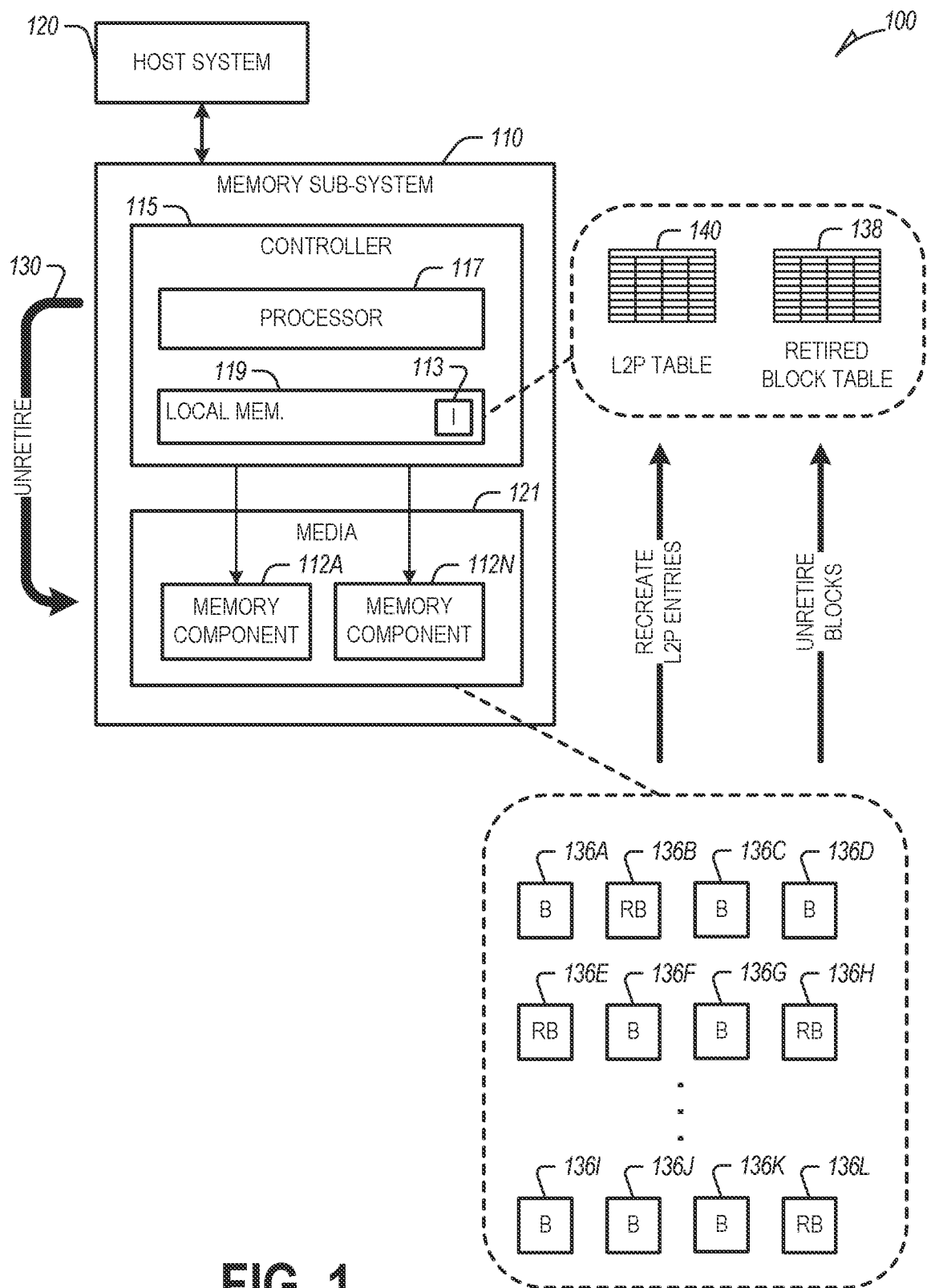
FIG. 1 illustrates an example computing environment that includes a memory sub-system in accordance with some embodiments of the present disclosure.

Aspects of the present disclosure are directed to a memory sub-system with block un-retirement. A memory sub-system is also hereinafter referred to as a "memory device." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. Different memory components can include different types of media. Examples of media include, but are not limited to, a cross-point array of non-volatile memory and flash-based memory cells. Various memory components into subunits, referred to herein as blocks. For example, negative-and (NAND) type flash memory is organized into blocks and pages. A page includes a set of memory cells that can be written to and read from at the same time. A block includes multiple pages. All the pages in a block are erased at the same time.

Blocks at a memory component that are not functional can be retired. A block that is retired is no longer used to store data. As long as the number of retired blocks at a memory component and is less than a threshold, the memory component remains functional. A memory sub-system tracks retired blocks, for example, by marking the retired blocks and/or by keeping one or more retired block tables. For example, a retired block indicator may be written to blocks that are retired. A retired block indicator may include a particular word or words written to a particular location at the block. In some examples, a retired block indicator includes the absence of a particular word or words written to a particular location at the block. Keeping a retired block table includes storing indications of blocks that have been retired. In some examples, separate retired block tables are kept for blocks that have been retired for different reasons. For example, use-retired blocks may be described by a dedicated use-retired block table. When the memory sub-system selects a physical address to write a data unit, it consults a retired block table or otherwise selects a physical address that is not part of a retired block.

Blocks can be retired at different points in the lifecycle of a memory sub-system. For example, after a memory component is manufactured, it may be tested. Blocks that are found to be nonfunctional are retired. In some examples, blocks are also tested after one or more memory components are incorporated into a memory sub-system, such as an SSD. Blocks that are found to be nonfunctional are retired. Still other blocks become nonfunctional during use of a memory sub-system. These blocks are also retired. Blocks that become nonfunctional and are retired during use of a memory sub-system are referred to as "grown bad blocks" or use-retired blocks.

The memory sub-system detects grown bad blocks by detecting blocks that fail to successfully complete instructed operations. For example, if read or write operations at one or more physical address (e.g., pages) of a block fail, the block may be retired. Also, for example, if the block fails to successfully erase, the block may be retired. The success or failure of an operation at a block or page thereof can be determined in any suitable way. For example, some memory components include a status register that indicates whether the most recent operation is successful. Sometimes a memory system attempts to perform a remedial action at a malfunctioning block before retiring the block. For example, a page that is not successfully read may be subject to a read retry process. If the read retry process is successful, the page (and the block of which it is a part) remain in use. If the read retry process is unsuccessful, the block including the page is retired.

In a conventional memory sub-system, there is no mechanism for unretiring a block once it is retired. This can lead to difficulties when a block is mistakenly retired or retired because of a transient event. Consider an example in which a firmware bug causes a memory sub-system to read a memory component with the wrong trim settings (e.g., threshold voltages, read duration, etc.). In this example, it is likely that read operations using the wrong trim settings will fail, even at pages that are not malfunctioning. Accordingly, the memory sub-system will retire blocks that are functional (e.g., if read with the correct trim settings). Consider another example where the characteristics of a block change over time. For example, some blocks experience a higher likelihood of a failed erase operation at a certain point in their lifecycle. The characteristic is likely to subside as additional read, write, and erase cycles are executed at the cell. When a block is retired due to a transient event, the available storage at the memory sub-system is unnecessarily reduced. If too many blocks are retired, a memory component or entire memory sub-system can become unusable. For example, the memory component and/or sub-system may become write-locked.

Aspects of the present disclosure address the above and other deficiencies by providing a memory sub-system that includes logic for unretiring blocks, for example, after a transient event has passed. The memory sub-system executes an unretire command. Executing the unretire command includes identifying use-retired blocks at one or more memory components of the memory sub-system and removing the use-retired blocks from a retired block table. In this way, the memory sub-system can continue to store data at the unretired blocks. In some examples, the memory sub-system also recreates logical-to-physical (L2P) table entries for some or all of the pages at the unretired blocks. In this way, data stored at the blocks that was lost when the blocks were retired may be recovered.

FIG. 1 illustrates an example computing environment 100 that includes a memory sub-system 110 in accordance with some embodiments of the present disclosure. The memory sub-system 110 can include media 121, such as memory components 112A to 112N. The memory components 112A to 112N can be volatile memory components, non-volatile memory components, or a combination of such. In some embodiments, the memory sub-system 110 is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as Single Level Cells (SLCs) or Multilevel Cells (MLCs). (MLCs refer generally to memory cells that store more than one bit of data, including two level cells, triple level cells (TLCs) or quad-level cells (QLCs)). In some embodiments, a particular memory component can include both an SLC portion and a MLC portion of memory cells. Each of the memory cells can store one or more bits of data used by the host system 120 or memory sub-system 110. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. In the example memory sub-system 110 of FIG. 1, the local memory 119 includes the L2P table 140, which may include L2P entries for physical addresses at the various memory components 112A, 112N described herein.

While the example memory sub-system 110 in FIG. 1 has been illustrated as including the controller 115, in another embodiment of the present disclosure, a memory sub-system 110 may rely upon external control (e.g., provided by an external host, or by a processor or controller separate from the memory sub-system) to perform some or all the management of the memory sub-system 110. In examples where some or all the management of the memory sub-system 110 are performed by an external host, the controller 115 may be omitted.

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical address and a physical address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive a logical address from the controller 115 and decode the logical address to one or more physical addresses (e.g., pages) at the memory components 112A to 112N. In some examples, the memory sub-system maintains a logical-to-physical (L2P) table 140. The L2P table includes L2P table entries. An L2P table entry relates a logical address to a corresponding physical address at a memory component 112A, 112N, the L2P table is stored at the local memory 119 of the controller 115 in FIG. 1, but may be stored in other suitable locations in various examples.

The memory sub-system 110 of FIG. 1 includes blocks 136A, 136B. 136C. 136D. 136E, 136F, 136G, 136H, 136I. 136J. 136K. 136L. Although twelve blocks are shown, any suitable number of blocks may be included in the memory component 112N. The blocks 136A. 136B, 136C. 136D. 136E, 136F, 136G, 136H, 136I. 136J. 136K. 136L may be part of one or all the memory components 112A. 112N.

The blocks 136A. 136B, 136C, 136D, 136E, 136F, 136G, 136H, 136I, 136J. 136K. 136L include retired blocks 136B, 136E, 136H, 136L. The retired blocks 136B. 136E, 136H, 136L may have been retired for any suitable reason. For example, some of the retired blocks 136B, 136E, 136H, 136L may have been retired during manufacturing and/or related testing of the memory components 112A. 112N and/or the memory sub-system 110. Others of the retired blocks 136B, 136E, 136H, 136L are use-retired blocks retired by the memory sub-system 110 upon detecting a block malfunction.

The memory sub-system 110 may track retired blocks in one or more of several different ways. In some examples, the retired blocks 136B. 136E, 136H, 136L are marked with a retired block indicator. The retired block indicator may be a word written to a particular location at the block or at a metadata location associated with the block. The retired block indicator, in some examples, includes an indication of a type of the retired block. For example, the retired block indicator may indicate whether the retired block is a use-retired block. In addition to or instead of marking retired blocks, the memory sub-system 110 can maintain a retired block table 138, for example, at the memory 119 or another suitable location (e.g., at the memory components 112A. 112N). Each retired block 136B, 136E. 136H. 136L is referenced by a retired block table entry. The retired block table entry for a retired block 136B. 136E, 136H, 136L includes a description of retired block 136B. 136E, 136H, 136L including, for example, a physical address or addresses associated with the block. For example, the retired block table entry for a retired block may reference the addresses for each page of the block. In some examples, the retired block table entry for a block indicates a type of the retired block. For example, if a block was retired during manufacturing of a memory component 112A. 112N or the memory sub-system 110, this may be indicated at the retired block table entry for that block. Also, if a block is a use-retired block, this may be indicated at the retired block table entry for that block.

Retired block table entries for retired blocks 136B. 136E, 136H, 136L, in some examples, include additional metadata describing the retired blocks 136B, 136E. 136H, 136L. For example, a retired block table entry may include a date stamp indicating when the block was retired. In some examples, a retired block table entry includes a description of why the block was retired (e.g., that a read operation at the block was unsuccessful, that a write operation at the block was unsuccessful, that an erase operation at the block was unsuccessful, etc.). In some examples, a retired block table, such as the retired block table 138, includes entries describing a particular type of retired block only. For example, the retired block table 138 may include only entries referencing use-retired blocks. (Additional retired block tables may be kept, in some examples, to track blocks retired prior to use.)

The memory sub-system 110 considers retired blocks 136B. 136E, 136H, 136L when allocating physical addresses to store data. For example, before assigning a physical address (e.g., page) at a block to a logical address, the memory sub-system 110 determines whether the block including that physical address is retired. For example, the memory sub-system 110 may read the block to determine the presence or absence of a retired block indicator at the block or a metadata location associated with the block. In some examples, the memory sub-system 110 refers to the retired block table 138 to determine if the block corresponding to the physical address is retired.

In the example environment 100, the memory sub-system 110 executes an unretire operation 130. The unretire operation 130 unretires some or all the use-retired blocks at the memory components 112A, 112N. The unretire command 130 includes identifying blocks at the memory sub-system 110 that are use-retired. This may include accessing a retired block table 138 to identify entries that correspond to use-retired blocks. The use-retired blocks that are identified are unretired. Unretiring a block includes modifying a retired block table entry referencing the block. In some examples, modifying the retired block table entry includes removing or deleting the retired block table entry from the retired block table 138. In other examples, modifying the retired block table entry includes writing to the retired block table entry an indication that the referenced block is not retired. Also, in some examples, unretiring a block includes removing or modifying a retired block indicator written to the block and/or to a metadata location associated with the block.

When a block is unretired, as described herein, physical addresses at the block become available to store data. Consider an example in which the memory sub-system 110 processes a write request including a logical address and a data unit. While a block is retired, the memory sub-system 110 does not select a physical address at that block to store the data unit and correspond to the logical address at the L2P table 140. After the block is unretired, the memory sub-system 110 may select a physical address at that block to store the data unit and correspond to the logical address at the L2P table 140.

In some examples, the unretire operation 130 includes executing an operation at one or more of the use-retired blocks before unretiring. For example, the memory sub-system 110 executes an erase operation at some or all the use-retired blocks. If the erase command is successful, then the block is unretired. On the other hand, if the erase command is unsuccessful, then the use-retired block may not be unretired. This may address blocks that were retired due to changes in the erase characteristics of the block itself. For example, executing an additional erase cycle at the block may correct the original issue that caused the block to be retired. In some examples, executing the operation at one or more of the use-retired blocks includes executing one or more read commands or write commands at one or more physical addresses of the block.

In some examples, the unretire operation 130 also includes recreating an L2P table entry for one or more physical addresses at the unretired blocks. Consider an example block that is use-retired after the failure of a read operation at a physical address in the block. When the block is retired, the memory sub-system 110 modifies L2P table entries referencing physical addresses at the block, for example, by deleting the entries and/or modifying the entries to point to alternate physical addresses at other blocks. Data at the retired block that cannot be read and moved to another block is lost. If, as described herein, the failure of the read operation occurred because of a transient condition, then the data may still be present at the physical address. If the memory sub-system 110 can recreate the L2P table entries pointing to physical addresses at the unretired block, then data may be restored.

In some examples, the unretire operation 130 includes executing a read operation at some or all the physical addresses at an unretired block. If the read operation or operations at the block are successful, then the memory sub-system 110 recreates L2P table entries for some or all the physical addresses at the block. The L2P table entries may be re-created in any suitable manner. In some examples, entries at the L2P table 140 include references to physical addresses at retired blocks. For example, when a block is retired, as described herein, entries at the L2P table 140 are modified to remove references to physical addresses at retired blocks. In some examples, references to physical addresses at the retired blocks are written to another field at the entry. In this way, the original L2P table entry may be recreated using the references. In other examples, when a physical address is assigned a corresponding logical address, metadata describing the logical address is written to a physical address itself and/or to a metadata location. The metadata location may be at the block including the physical address and/or elsewhere at the memory component 112A, 112N. The memory sub-system 110 may recreate L2P table entries for a block by scanning some or all the physical addresses at the block and/or metadata locations thereof to obtain the corresponding logical addresses. For each physical address, then, an L2P table entry is created and written to the L2P table 140.

In the example environment 100 of FIG. 1, instructions 113 for executing an unretire operation 130 as described herein are stored at the local memory 119 of the controller 115. For example, the controller 115 may execute the unretire command 130. In other examples, some or all the unretire command 130 is performed elsewhere. For example, some or all the unretire operation 130 may be executed at the host system 120 and/or by the memory components 112A, 112N.

Figure 2:
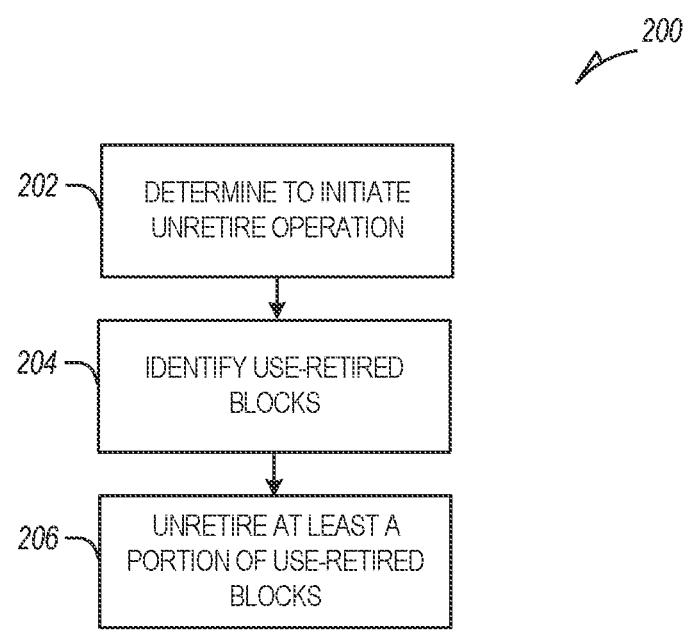
FIG. 2 is a flow diagram of an example method to execute an unretire operation, in accordance with some embodiments of the present disclosure.

FIG. 2 is a flow diagram of an example method 200 to execute the unretire operation 130, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing logic determines to initiate the unretire command 130. The processing logic determines to initiate the unretire command 130, for example, if it receives an instruction to initiate the unretire command. The instruction may originate, for example, from the host 120. In another example, the processing logic determines if an unretire condition exists. An unretire condition exists, for example, if a pattern of use-retired blocks at the memory sub-system 110 suggests that in-use retirements have occurred due to a transient event. Examples of unretire conditions are described herein with respect to FIG. 5. In some examples, the unretire command is executed for all memory components 112A, 112N at the memory sub-system 110.

At operation 204, the processing logic identifies use-retired blocks. This may occur in any suitable manner. For example, the processing logic may examine retired block indicators at the retired blocks and/or metadata locations associated with the retired blocks. The retired block indicators may indicate whether a block was retired during use or was previously retired. In another example, the processing logic consults the retired block table 138. In some examples, the retired block table 138 includes retired block table entries only for use-retired blocks. Accordingly, retired blocks referenced by the retired block table 138 may be use-retired blocks. In some examples, retired block table entries at the retired block table 138 indicate whether a referenced retired block is use-retired or was previously retired.

At operation 206, the processing logic unretires the use-retired blocks identified at operation 204. Unretiring a block includes modifying an entry for the block at the retired block table 138. Modifying the entry may include deleting the entry or otherwise indicating at the entry that the block is no longer retired. Unretiring a block may also include removing or modifying a retired block indicator from the block or from a metadata location associated with the block.

Figure 3:
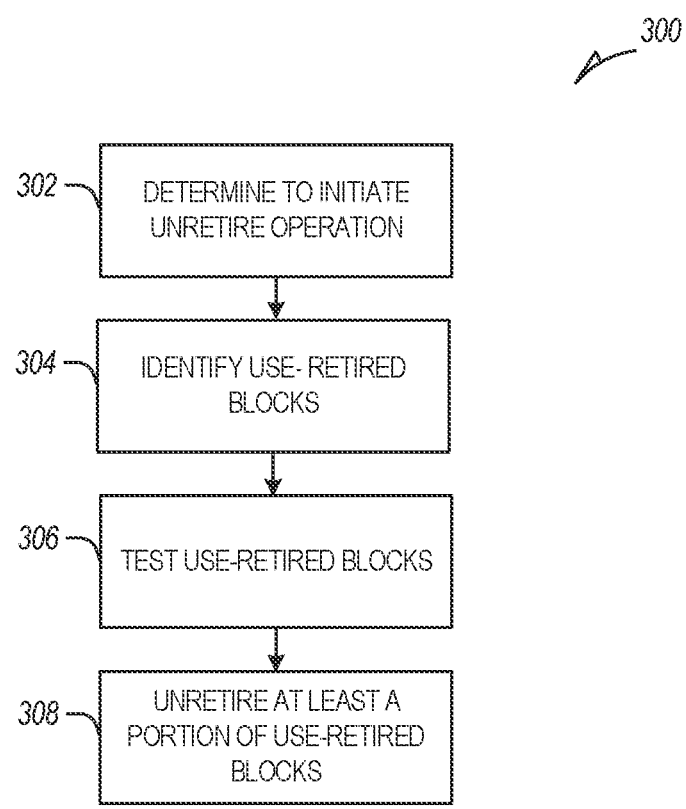
FIG. 3 is a flow diagram of another example method to execute an unretire operation, in accordance with some embodiments of the present disclosure.

FIG. 3 is a flow diagram of another example method 300 to execute the unretire operation 130, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic determines to initiate the unretire operation 130. The operation 302 may be executed in a manner like that described above with respect to the operation 202. At operation 304, the processing logic identifies use-retired blocks. The operation 304 may be executed in a manner like that described above with respect to the operation 204.

In the example method 300, the processing logic tests use-retired blocks before unretiring the blocks. For example, although some or even most of the use-retired blocks may have been retired due to a transient event, other of the use-retired blocks may have been retired due to non-transient malfunctions. Accordingly, at operation 306, the processing logic tests the use-retired blocks identified at operation 304. Testing a use-retired block includes executing at least one operation at the block.

In some examples, testing a use-retired block includes executing an erase operation at the block. For example, as described herein, some blocks have an increased likelihood of a failed erase operation at certain points in the block's lifecycle. Executing an additional erase operation increases the likelihood of success. Also, because the condition is transient, the block may be unlikely experience the issue again. Also, in some examples, testing a use-retired block includes executing a read and/or write operation at some and/or all the physical addresses at the block. In some examples, testing a use-retired block includes executing and erase operation at the block and executing read and/or write operations at some and/or all the physical addresses at the block.

At operation 308, the processing logic unretires at least a portion of the use-retired blocks. For example, the processing logic may unretire only blocks at which operations executed at operation 306 were successful. If one or more operations executed at a block at operation 306 are unsuccessful, it may be an indication that the block should remain retired. Accordingly, the processing logic may not unretire these blocks.

Figure 4:
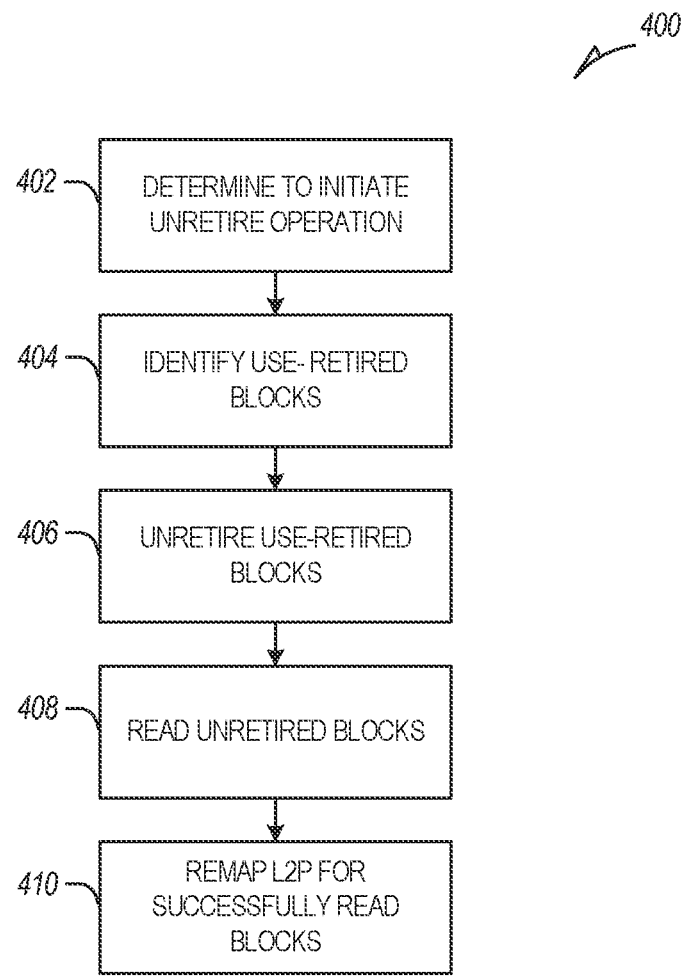
FIG. 4 is a flow diagram of another example method to execute the unretire operation, in accordance with some embodiments of the present disclosure.

FIG. 4 is a flow diagram of another example method 400 to execute the unretire operation 130, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic determines to initiate the unretire operation 130. The operation 402 may be executed in a manner similar to that described above with respect to the operation 202. At operation 404, the processing logic identifies use-retired blocks. The operation 404 may be executed in a manner similar to that described above with respect to the operation 204. At operation 406, the processing logic unretires the use-retired blocks identified at operation 404, for example, as described with respect to operation 206 above. All use-retired blocks may be unretired. In some examples, less than all the use-retired blocks are unretired. For example, an operation or operations may be executed at the use-retired blocks, as described herein with respect to FIG. 3. Blocks at which the one or more operations are successful are unretired. Blocks at which one or more of the operations are unsuccessful may not be unretired.

At operation 408, the processing logic reads the blocks unretired at operation 406. Reading the blocks includes executing one or more read operations at physical addresses of the unretired blocks. In some examples, a read operation is executed at each physical address of each unretired block. In other examples, a read operation is executed at less than all the physical addresses of the unretired blocks. For example, read operations may be executed at a range of physical addresses at the block.

At operation 410, the processing logic recreates L2P table entries for some or all the physical addresses of the unretired blocks. In some examples, the processing logic recreates L2P table entries for all physical addresses associated with blocks that were successfully read at operation 408. For example, if a read operation at a block was successful, the processing logic recreates an L2P table entry for all physical addresses at the block (or for all physical addresses at the block that were associated with a logical address before the block was originally retired). In other examples, the processing logic recreates L2P table entries only for physical addresses that were successfully read. After L2P table entries for the unretired block are recreated, data at the block may be accessible by read operations, for example, as before the blocks were retired.

There are a several different ways that the processing logic can recreate L2P table entries for physical addresses at an unretired block. In some examples, the processing logic recreates L2P table entries using metadata included in the L2P entries themselves. Consider an example in which a block is newly-retired. The processing logic updates the L2P table 140 to reflect that physical addresses at the block are no longer active. This includes identifying L2P table entries at the L2P table 140 that reference physical addresses at the newly-retired block. These L2P table entries are modified to remove the association between logical addresses and the physical addresses at the newly-retired block. References to the physical addresses may be deleted and sometimes also replaced with references to new physical addresses at active blocks. In some examples, the physical addresses to the newly-retired block are written back to the L2P table entries at a different field, e.g., a previously-associated physical address field. When a block is unretired, the processing logic scans the L2P table 140 to identify physical addresses from the unretired block at the previously-associated physical address field. The processing logic modifies the L2P table entries to restore the association between the logical addresses of the entries and the previously-associated physical addresses. For example, the physical address from the unretired block at the previously-associated physical address field may be written to a current physical address field of the L2P table entry.

In other examples, the processing logic recreates L2P table entries using metadata stored at the unretired blocks and/or at metadata locations associated with the unretired blocks. For example, when a physical address is associated with a logical address, the association is may be memorialized with an L2P table entry. In some examples, the processing logic also stores an indication of the logical address to the block including the physical address and/or to a metadata location associated with the block. When a block is unretired, the processing logic scans the block and/or its associated metadata location to identify relationships between physical addresses at the block and logical addresses. For each pair of physical and associated logical addresses, the processing logic generates an L2P table entry. The L2P table entry is written to the L2P table 140.

As described herein, some transient events leading to the retirement of blocks during use occur due to errors in the controller 115 of the memory sub-system 110. For example, the controller 115 may attempt to read, write, and/or erase memory components 112A, 112N with the wrong trim levels. Errors in the operation of the controller 115 can be fixed, in some examples, by downloading corrected firmware to be executed at the controller 115. Additionally, some transient events leading to the retirement of blocks can occur due to the limitations of a previously-executed version of firmware for the controller 115. For example, a new version of the firmware may have enhanced capabilities for reading, writing, or erasing at the memory components 112A, 112N. For these and other reasons, it may be desirable in some circumstances, to execute the unretire command 130 when firmware is loaded to the memory sub-system.

Figure 5:
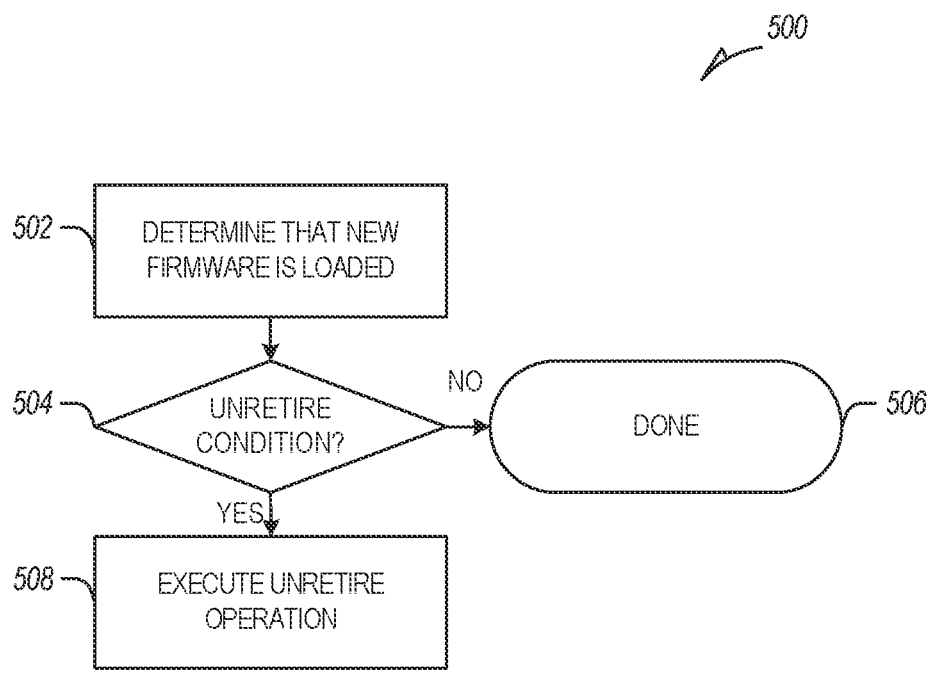
FIG. 5 is a flow diagram of an example method to determine whether to execute an unretire operation, as described herein, in accordance with some embodiments of the present disclosure.

FIG. 5 is a flow diagram of an example method 500 to determine whether to execute an unretire operation, as described herein, in accordance with some embodiments of the present disclosure. For example, the method 500 shows one example way that the processing logic can perform the operations 202, 302, 402 described herein. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic determines that new firmware has been loaded to the memory sub-system 110. The processing logic may be included as part of the downloaded firmware. The processing logic may determine that firmware has been loaded to the memory sub-system 110 in any suitable manner. For example, a firmware load flag may be set when firmware is loaded. The firmware load flag may be stored, for example, at the local memory 119 of the controller 115, to a memory component 112A, 112N, or to another suitable location. If the processing logic determines that the firmware load flag is set, it may clear the flag and determine that new firmware has been loaded. Also, in some examples, the processing logic may store a firmware version indicator. At startup, the processing logic may determine if a current firmware version indicator matches the stored firmware version indicator. If there is no match, then the processing logic determines that new firmware has been loaded.

At operation 504, the processing logic determines whether an unretire condition exists at the memory sub-system 110. An unretire condition exists if the number and/or arrangement of retired blocks indicates that a transient condition may have caused the erroneous in-use retirement of blocks. The unretire condition may be based on some or all of various factors. For example, the unretire condition may be based on the number of use-retired blocks at the memory sub-system. In some examples, the unretire condition is based on the percentage of all blocks that are use-retired. In some examples, the unretire condition is based on when the use-retired blocks were retired. In some examples, the unretire condition is based on the reasons that use-retired blocks were retired.

One example unretire condition is present if more than a threshold number of blocks have been retired. Another example unretire condition is present if more than a threshold number of blocks have been retired for a common reason. For example, the unretire condition may be present is more than a threshold number of blocks were retired for failure to successfully read. The unretire condition may be present is more than a threshold number of blocks were retired for failure to successfully write. The unretire condition may be present is more than a threshold number of blocks were retired for failure to successfully erase.

Another example unretire condition is present if more than a threshold number of blocks have been retired close in time. For example, if more than a threshold number of blocks were retired within an hour of each other, an unretire condition may exist. Another example unretire condition is present if more than a threshold number of blocks were retired within a threshold time of a change event at the memory sub-system 110 such as, for example, a loss of power, the loading of a previous firmware version, etc. Example unretire conditions can also include permutations of the conditions described herein. For example, the processing logic may detect an unretire condition if more than a threshold number of blocks were retired within a threshold time of one another for a particular reason.

If the processing logic determines that no unretire condition exists, then the method 500 may complete at operation 506. The memory sub-system 110, in some examples, begins or resumes normal operation. If the processing logic determines that an unretire condition exists, the processing logic executes an unretire operation at operation 508. This may be performed as described herein, for example, with respect to FIGS. 1-4.

Figure 6:
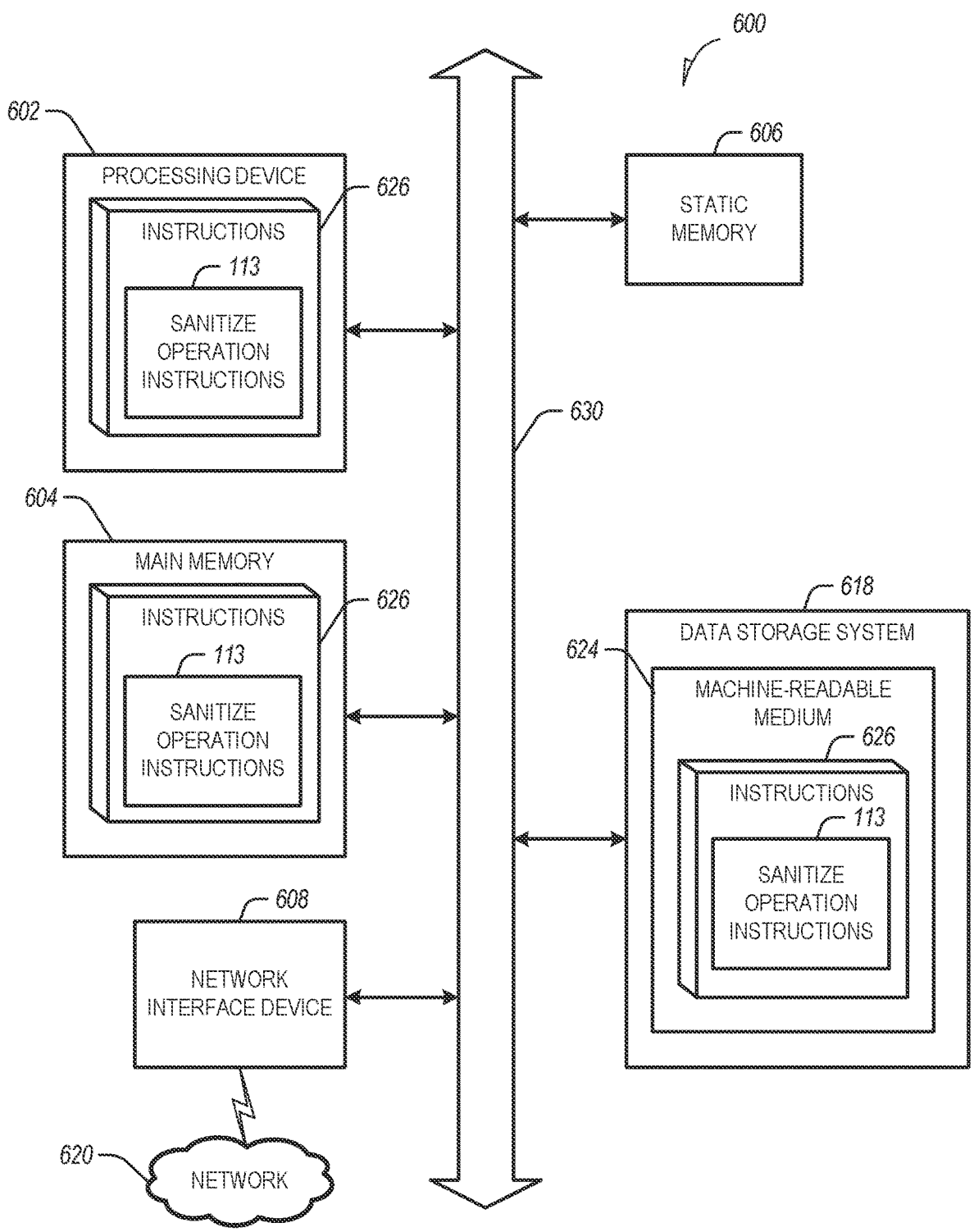
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to execute instructions 113 for executing a unretire operation. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a non-transitory machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 10 of FIG. 1.

In one embodiment, the instructions 626 include instructions 113 to implement functionality corresponding to the unretire operation, as described herein. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that can store or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks. CD-ROMs. and magnetic-optical disks, read-only memories (ROMs), random access memories (RAMs).

EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component comprising a plurality of blocks; and
a processing device operably coupled to the memory component, the processing device configured to perform operations comprising:
retiring a set of blocks based on first trim settings, the set of blocks comprising a first block;
implementing a firmware update comprising second trim settings;
determining that the set of retired blocks includes more than a threshold number of blocks that were retired for a common reason;
identifying, using the second trim settings, the first block as a readable block;
based on the identifying of the first block, modifying first data referencing the first block to indicate that the first block is not retired; and
recreating a logical-to-physical table entry for a page of the first block, the logical-to-physical table entry associating a logical address with the page.

2. The system of claim 1, wherein:
the operations further comprise:
executing a first operation at the first block; and
executing a second operation at a second block of the set of retired blocks;
the identifying of the first block as a readable block is based on a first determination that the first operation was successful; and
the second block is not identified as a readable block based on a second determination that the second operation was not successful.

3. The system of claim 1, wherein the operations further comprise:
executing an erase operation at the first block; and
before modifying the first data to indicate that the first block is not retired, determining that the erase operation was successful.

4. The system of claim 1, wherein the operations further comprise:
before recreating the logical-to-physical table entry for the page, determining that a first read operation at the first block was successful.

5. The system of claim 4, wherein the recreating of the logical-to-physical table entry comprises reading the first logical address from a metadata location at the first block.

6. The system of claim 4, wherein the recreating of the logical-to-physical table entry comprises:
determining that the logical-to-physical table entry describes a physical address of the page as a previously-associated physical address; and
writing the physical address of the page to a current physical address field of the logical-to-physical table entry.

7. The system of claim 1, wherein the firmware update fixes a bug in existing firmware.

8. The system of claim 1, wherein the firmware update has enhanced capabilities for reading, writing, or erasing blocks of the memory component.

9. The system of claim 1, wherein the operation of identifying the first block as a readable block is performed based on the implementing of the firmware update.

10. The system of claim 1, wherein the operations further comprise:
determining that the set of retired blocks includes more than a threshold number of blocks that were retired after implementation of a previous firmware update.

11. A method, comprising:
retiring a set of blocks based on first trim settings, the set of blocks comprising a first block;
implementing a firmware update comprising second trim settings;
determining that the set of retired blocks includes more than a threshold number of blocks that were retired for a common reason;
identifying, using the second trim settings, the first block as a readable block;
based on the identifying of the first block, modifying a first table entry referencing the first block to indicate that the first block is not retired; and
recreating a logical-to-physical table entry for a page of the first block, the logical-to-physical table entry associating a logical address with the page.

12. The method of claim 11, further comprising:
executing a first operation at the first block of the set of retired blocks; and
executing a second operation at a second block of the set of retired blocks; and wherein
the identifying of the first block as a readable block is based on a first determination that the first operation was successful; and
the second block is not identified as a readable block based on a second determination that the second operation was not successful.

13. The method of claim 11, further comprising:
executing an erase operation at the first block; and
before modifying the first table entry to indicate that the first block is not retired, determining that the erase operation was successful.

14. The method of claim 11, further comprising:
before recreating the logical-to-physical table entry for the page, determining that a first read operation at the first block was successful.

15. The method of claim 11, wherein the recreating of the logical-to-physical table entry comprises reading the first logical address from a metadata location at the first block.

16. The method of claim 11, wherein the recreating of the logical-to-physical table entry comprises:
determining that the logical-to-physical table entry describes a physical address of the page as a previously-associated physical address; and
writing the physical address of the page to a current physical address field of the logical-to-physical table entry.

17. A non-transitory machine-readable storage medium comprising instructions thereon that, when executed by a processing device, cause the processing device to perform operations comprising:
retiring a set of blocks based on first trim settings, the set of blocks comprising a first block;
implementing a firmware update comprising second trim settings;

determining that the set of retired blocks includes more than a threshold number of blocks that were retired for a common reason;

identifying, using the second trim settings, the first block as a readable block;

based on the identifying of the first block, modifying a first table entry referencing the first block to indicate that the first block is not retired; and recreating a logical-to-physical table entry for a page of the first block, the logical-to-physical table entry associating a logical address with the page.

18. The machine-readable storage medium of claim 17, wherein:

the operations further comprise:

executing a first operation at the first block; and executing a second operation at a second block of the set of retired blocks;

the identifying of the first block as a readable block is based on a first determination that the first operation was successful; and the second block is not identified as a readable block based on a second determination that the second operation was not successful.

19. The machine-readable storage medium of claim 17, wherein the operations further comprise:

executing an erase operation at the first block; and before modifying the first table entry to indicate that the first block is not retired, determining that the erase operation was successful.

20. The machine-readable storage medium of claim 17, wherein the operations further comprise:

before recreating the logical-to-physical table entry for the page, determining that a first read operation at the first block was successful.

\* \* \* \* \*